Jan. 3, 1956 W. J. SCHWARZ 2,729,574
COATED ROOFING AND SIDING AND PROCESS OF PREPARING THE SAME
Filed May 7, 1952
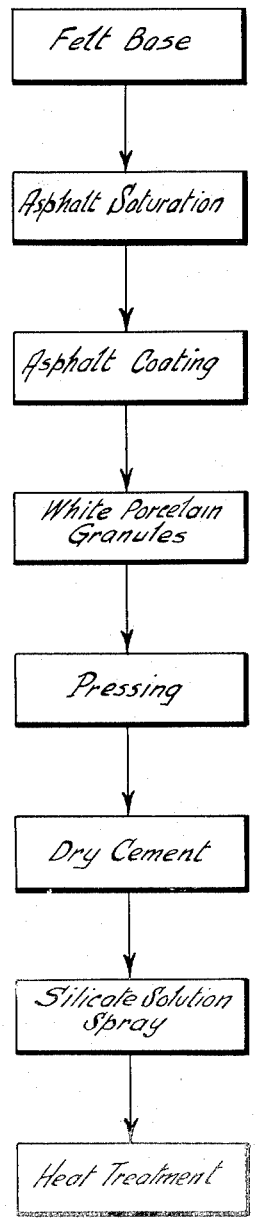
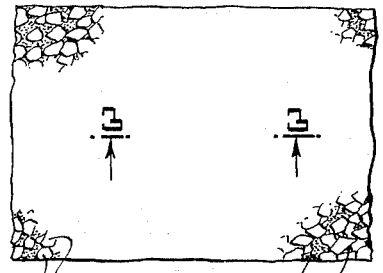
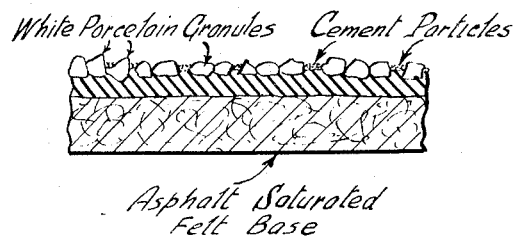
INVENTOR
WALTER J. SCHWARZ

United States Patent Office 2,729,574
Patented Jan. 3, 1956

2,729,574

COATED ROOFING AND SIDING AND PROCESS OF PREPARING THE SAME

Walter J. Schwarz, New Orleans, La., assignor to The Patent and Licensing Corporation, New York, N. Y., a corporation of Massachusetts Application May 7, 1952, Serial No. 286,643

6 Claims. (Cl. 117—25)

The present invention relates to an improved composition roofing and siding, and more particularly to an improved asphalt roofing shingle having light colored granules on the surface thereof, and to a process for preparing it.

For many years, roofing shingles and insulating siding have been prepared by coating a bitumen impregnated base with a layer of bituminous material, covering the bituminous material with a surface of granules of crushed slate or the like and pressing the granules to cause embedding in the bituminous material. This process may be repeated, particularly in the butt end of the shingle to obtain a multiplicity of layers of bituminous material and granules.

More recently there has been an interest and demand for roofing and siding with light colored granules, including white granules. One of the best available white granules is crushed white porcelain. This material, however, is subject to certain difficulties. Due to the inherent smooth surface of the porcelain, the granules exhibit relatively poor bonding characteristics to the asphalt coating, resulting in a rather pronounced shedding propensity upon exposure to weathering, which difficulty is further enhanced by the photokinetic hardening of the asphalt coating upon exposure. In order to overcome the relatively poor bonding characteristics, embedding pressure in manufacturing has been kept at a maximum, causing the coating asphalt to press through between the granules to thus become more exposed to the deteriorating influences of the weather. This also contributes to reduce the white color as the black asphalt coating appearing between the white granules lessen the total white appearance.

It is, therefore, an object of the present invention to produce an improved light colored composition roofing and siding.

It is a further object of the present invention to provide an improved light colored composition roofing and siding having substantially no black bituminous material showing.

It is a further object of the present invention to provide an improved composition roofing and siding having light colored granules resistant to shedding.

It is a further object of the present invention to provide an improved composition roofing and siding having a surface of white porcelain granules.

It is a further object of the present invention to provide a process for producing an improved composition roofing and siding having a surface of light colored granules.

These and other objects are attained by this invention which provides an improved composition roofing and siding having a bituminous coated base, a surface of light colored granules and a composition of dry light colored pigment and alkali silicate between the granules.

The following is an illustration of one preferred embodiment of the invention, but it will be understood that substitutions and variations may be made within the scope of the claims.

An asphalt saturated felt was coated in the usual manner with asphalt in a plastic state. The asphalt was covered with a layer of crushed white porcelain and roll pressed in the usual manner. Excess granules were blown off and the surface was sprayed with a dry white Portland cement while the coating was still hot and soft. The surface was then moistened with a fine mist of a solution of sodium silicate containing 10 to 15% solids. The setting of the silicate was then achieved by heating as with a narrow flame jet impinging on the surface of the product.

The drawing is self-explanatory.

Fig. 1 shows the various steps in the process beginning with the felt base, saturating it with asphalt, coating the upper side of it with asphalt, applying white porcelain granules, pressing, applying dry white cement, spraying on sodium silicate solution and heat treating.

Fig. 2 is a top view of a portion of a shingle showing the cement particles between the white porcelain particles.

Fig. 3 is a cross-sectional view showing the asphalt saturating base with the asphalt coating, the white porcelain granules pressed into the asphalt coating and the cement particles covering the exposed asphalt between the granules.

Instead of the white porcelain mentioned in the example, various colored porcelains may be used, such as may be obtained as a by-product of the bathroom fixtures industry. Alternatively, instead of porcelain, various light colored granules (including white) may be utilized, which are well-known in the art and obtainable commercially, including crushed slate having a baked-on coating of pigment and sodium silicate. The advantages of the invention, however, are most applicable to porcelain, and the bright white or light color effect obtained therefrom is most desirable.

Instead of Portland cement alone, used in the example as the pigment, other light colored pigments may be used such as zinc oxide, titanium dioxide, etc., in conjunction with Portland cement and silicate, or with silicate alone. However, the Portland cement is preferable since the most desirable bonding action is obtained thereby. The cement may be mixed with another light colored pigment. The cement is preferably a non-blooming type, high in alumina content and low in lime.

Instead of the sodium silicate used in the example, other alkali metal silicates such as potassium silicate may be used.

While the invention is utilized primarily with an asphalt base, other bituminous materials, such as coal tar pitch, are also operable.

The invention has been outlined above as relating to a roofing composition which may include roll roofing as well as shingles, although the invention is most applicable to shingles. The shingles may be applied to walls as well as to roofs, and the invention is also intended to include the material known as insulating siding, which is similar to the roofing shingles but has a backing of insulation board instead of the roofing felt. Insulating siding, as well as the roofing shingles, may also contain designs embossed ttherein and multi-colored granules.

The cement as used herein is to be distinguished from a semi-rigid or rigid Portland cement coating which is known to the prior art. There is no continuous film, but rather, the granules protrude from the surrounding cement containing surface. The particles of cement remain largely as such and do not form large agglomerates as would occur if a cement slurry were used. The alkali silicate treatment followed by heat affords the fixing or bonding action.

The invention produces the desired advantages that the roofing composition presents a uniform white or light colored surface, as the case may be, without black bituminous material showing through. Furthermore, the granules are well bonded to reduce shedding, and the bituminous material is so completely covered as not to be easily affected by the weather.

I claim:

1. An improved composition roofing and siding comprising a base, a bituminous coating on said base, white porcelain granules embedded in said bituminous composition and cement particles coated with heat treated sodium silicate between said white porcelain granules.

2. An improved composition roofing and siding comprising a base, an asphalt coating on said base, white porcelain granules embedded in said asphalt composition and cement particles coated with heat treated sodium silicate between said white porcelain granules.

3. A process for preparing an improved composition roofing and siding which comprises coating a base with a bituminous material, applying light colored granules, pressing the granules into the bituminous material, applying Portland cement and another light colored dry pigment, spraying on alkali silicate solution and heat treating.

4. A process for preparing an improved composition roofing and siding which comprises coating a base with a bituminous material, applying light colored granules, pressing the granules into the bituminous material, applying dry cement, spraying on alkali silicate solution and heat treating.

5. A process for preparing an improved composition roofing and siding which comprises coating a base with a bituminous material, applying white porcelain granules, pressing the granules into the bituminous material, applying dry cement, spraying on alkali silicate solution and heat treating.

6. A process for preparing an improved composition roofing and siding which comprises coating a base with asphalt, applying white porcelain granules, pressing the granules into the asphalt, applying dry cement, spraying on sodium silicate solution and heat treating.

References Cited in the file of this patent
UNITED STATES PATENTS

| | | |
|---|---|---|
| 1,134,086 | Lowrey | Mar. 30, 1915 |
| 1,314,753 | Overbury | Sept. 2, 1919 |
| 1,765,748 | Teague | June 24, 1930 |
| 2,021,716 | Douthett | Nov. 19, 1935 |
| 2,095,249 | Harshberger | Oct. 12, 1937 |
| 2,233,122 | Burns | Feb. 25, 1941 |
| 2,276,487 | Harshberger | Mar. 17, 1942 |
| 2,379,358 | Jewett | June 26, 1945 |